Dec. 13, 1932.  H. KRAFT  1,891,096

SPEED GOVERNING MECHANISM

Filed March 6, 1931

DRIVEN BY TURBINE SHAFT

Inventor:
Hans Kraft,
by Charles E. Tullar
His Attorney.

Patented Dec. 13, 1932

1,891,096

UNITED STATES PATENT OFFICE

HANS KRAFT, OF SCHENECTADY, NEW YORK, ASSIGNOR TO GENERAL ELECTRIC COMPANY, A CORPORATION OF NEW YORK

SPEED GOVERNING MECHANISM

Application filed March 6, 1931. Serial No. 520,638.

This invention relates to governing mechanisms for prime movers and particularly to that class of governing mechanisms which includes a valve controlling the supply of fluid to a prime mover, a fluid actuated motor for operating said valve and a speed responsive device for regulating said fluid actuated motor. It is well known to those skilled in the art that with a change of load the piston of the hydraulic cylinder of the fluid actuated motor does not generally stop directly in a position corresponding to the demand for fluid but overtravels, oscillating about such a position.

My invention comprises the provision of means for preventing considerable overtravel and oscillatory movements of the hydraulic cylinder piston, effecting thereby a more accurate and reliable control of such prime movers.

For a consideration of what I believe to be novel and my invention, attention is directed to the following description and the claims appended thereto.

Figure 1:
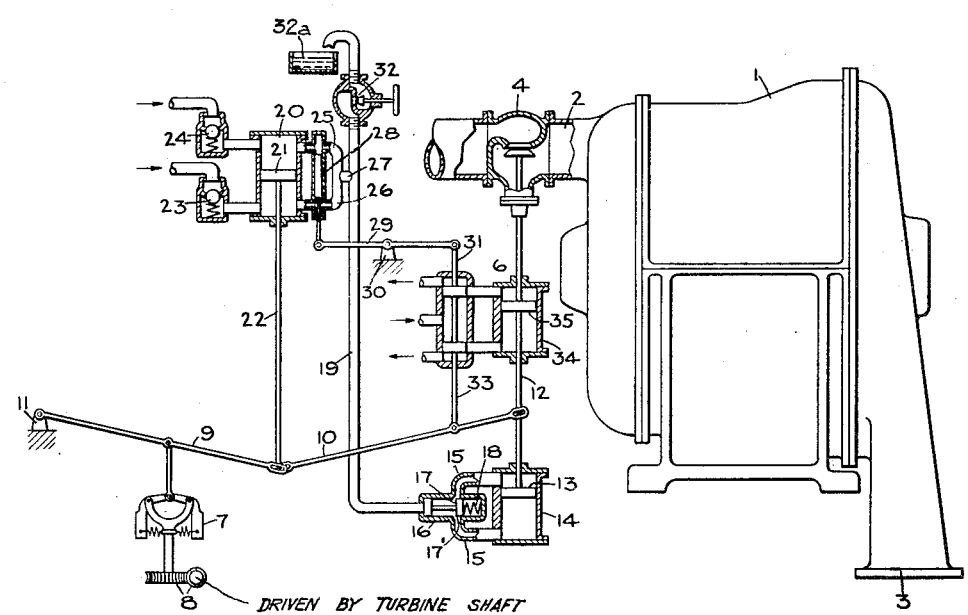
Figure 2:
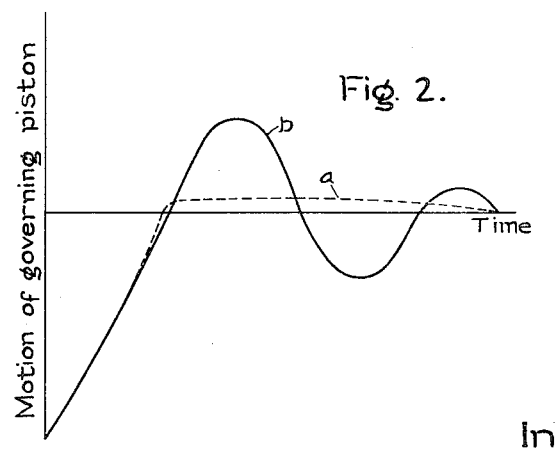

In the drawing, Fig. 1 is a diagrammatic view of a governing mechanism illustrating a preferred embodiment of my invention, and Fig. 2 shows the motion of the governing piston according to my invention (curve $a$) plotted against time and the corresponding curve of governing devices heretofore used (curve $b$).

Referring to the drawing, 1 designates an elastic fluid turbine having an admission 2 and an exhaust 3. A valve means 4, in the present instance shown as a normal disk valve, is provided in the admission to the turbine. The valve 4 is positioned by a fluid actuated motor 6, which is controlled by a suitable speed responsive device, in the present instance shown as a normal speed governor 7, driven through a worm gear 8 from the shaft of the turbine and connected to a lever mechanism 9, 10 fulcrumed at 11. The mechanism so far described may be taken as typical of any suitable governing mechanism for elastic fluid turbines and is well known to those skilled in the art.

In the present instance I have shown the piston stem 12 of the fluid actuated motor 6 as being connected with the piston 13 of a dashpot 14, the latter being filled with a liquid, such as oil or the like, and the upper and lower part thereof being short-circuited through suitable means, such as tubes 15. 16 indicates a regulating valve having a piston 17 normally pressed outwardly by the action of a spring 18 so as to prevent short-circuiting of the dashpot. Connected to the rear part of the regulating valve is a tube 19 through which oil is supplied so as to exert a pressure against piston 17 of the regulating valve, which under certain conditions causes a movement of this piston to the right and thereby a short-circuiting of the upper and lower part of the dashpot. The actuation of this dashpot takes place in response to the acceleration and retardation of the speed governor or in other words in response to the rate of governor speed change. It will be clear that in case of a quick load change causing a corresponding quick speed change it is desired to quickly eliminate the damping action of said dashpot so as to allow quick regulating movement of the fluid actuated motor and it will also be clear that it is desired to prevent further movement of the fluid actuated motor as soon as the valve means regulating the admission of elastic fluid to the turbine are in a position in which the admitted fluid corresponds to the desired load output of the turbine.

The regulation of the dashpot actuation in response to the rate of speed change of the generator is achieved in the present instance by the provision of a pumping cylinder 20 which is provided with a piston 21, having a stem 22 connected to the common pivot of levers 9 and 10. 23 and 24 designate two non-return valves through which oil or other liquid can be supplied to the cylinder 20. The upper and lower parts of said cylinder are normally short-circuited by pipes 25 and 26 having a common conduit 27 which is connected to pipe 19. 28 designates a piston connected to one end of a lever 29 having a fulcrum 30 and the other end connected to pilot valve piston 31 of fluid actuated motor 6. The actuation of this pressure cylinder is as follows: If stem 22 and accordingly piston 21 move upwardly, a corresponding downward movement of piston 28 takes place to the effect that the latter closes pipe 26, thus preventing the displacement of liquid between the upper and lower part of pressure cylinder 20 through pipes 25 and 26. The liquid displaced, due to the movement of piston 21, flows through conduit 27 and pipe 19 and exerts a pressure against valve piston 17 whereby the latter moves to the right and effects a short-circuiting between the upper and lower part of the dashpot. The oil leaves pipe 19 through an adjustable orifice 32 and is conveyed to a reservoir 32a. It will be readily understood that the actuation of the regulating valve 16 depends upon the rate of speed change of the turbine and also upon the adjustment of the orifice 32. Thus, the dashpot is more or less short-circuited if a quicker or slower movement of pistons 21 and 28 takes place corresponding to a quick or slow load change respectively of the prime mover. At very slow movements of the pistons 21 and 28, corresponding to very small or slow load changes, no actuation of the dashpot regulating valve 16 will result owing to a corresponding slow movement of said pistons 21 and 28 and also due to the provision of orifice 32 through which the displaced fluid has sufficient time to leave without causing a substantial increase of pressure in pipe 19. In order, however, to allow a slow movement of the dashpot piston and the fluid actuated motor, I normally provide a partial short-circuiting of the upper and lower part of the dashpot. In the present instance this partial short-circuiting is shown by a somewhat shortened piston 17 of the regulating valve which allows a slow displacement of fluid between the upper and lower part of the dashpot 14 through the small space 17' behind the front head of this piston.

The operation of my speed governing mechanism is as follows: Assume that the mechanism as shown is in a balanced position. If now the speed of the turbine increases, owing to a decrease in load, the flyweights of the speed governor will move outwardly and thus lower the right end of lever 9. This causes a downward movement of the pilot valve stem 33 to the effect that liquid is supplied through the pilot valve to the lower part of cylinder 34 and drained off from the upper part of this cylinder. This causes an upward movement of cylinder piston 35 and thus a closing action of valve 4. The upward movement of piston 35 causes a corresponding upward movement of the pilot valve stem 33 which thereby restores its original position.

The downward movement of pilot valve stem 33 causes also a corresponding downward movement of the right end of lever 29 to the effect that piston 28 closes conduit 25. Thus oil is being pressed, due to the downward movement of piston 21, through conduits 26, 27 and pipe 19 against regulating valve piston 17 whereby the latter effects short-circuiting between the lower and the upper part of the dashpot and thereby greatly eliminates the resistance of the latter.

As soon as the pilot valve 31 is returned to its original position, that is, as soon as the admitted steam corresponds to the demand for steam, piston 28 is also returned to its original position so that the upper and lower parts of piston 21 are again short-circuited.

The downward movement of piston 21 of the pressure cylinder also effects an opening of non-return valve 24, thereby allowing oil to be supplied to the upper part of the cylinder.

If the speed of the turbine decreases, owing to an increase in load, a corresponding actuation of the regulating mechanism will take place, but in the opposite direction whereby the upward movement of levers 9 and 10 will effect a corresponding upward movement of piston 21 and a downward movement of piston 28, thus closing conduit 26 and effecting an oil pressure through conduits 25, 27 and pipe 19, against the regulating valve 16 of the dashpot; and also allowing oil being supplied to the pressure cylinder through non-return valve 23.

As soon as the opening of the prime mover valve corresponds to the demand for fluid, that is, when the speed of the governor spindle approaches zero, the pressure exerted on the regulating valve piston 17 is released so that the communication of fluid between the upper and lower part of the dashpot is prevented to the effect that any further movement of the dashpot piston and accordingly the fluid actuated motor and the prime mover valve disk meet an extraordinarily high resistance. This high resistance causes the valve disk of the prime mover to stop without considerably overtraveling and oscillating as soon as the desired load output is reached.

The operation of my speed governing mechanism depends to a large extent on the opening of the adjustable orifice 32 which is normally set to effect a small overtravel of the prime mover valve, thereby allowing a slow speed change in a direction in which the original position of the pilot valve is restored.

In accordance with the provisions of the Patent Statutes I have described the principle of operation of my invention together with the apparatus illustrating a preferred embodiment thereof, but I do not desire to be limited to the embodiment illustrated in the drawing appended hereto, as my invention can be carried out by other means.

What I claim as new and desire to secure by Letters Patent of the United States, is:

1. A governing mechanism for prime movers comprising a fluid admitting valve means, a motor for actuating it, a pilot valve controlling the motor, a governor for the pilot valve, and damping means connected to the motor and means for actuating the damping means in response to the rate of the governor speed change for preventing overtravel and oscillations of said motor and valve.

2. A governing mechanism for prime movers comprising a fluid admitting valve means, a motor for actuating it, a pilot valve controlling the motor, a governor for the pilot valve, a means for damping the operation of said motor, said means having normally a high resistance whereby it forms a locking means for said motor and valve, and means for decreasing the resistance of said damping means in response to the rate of the governor speed change.

3. A governing mechanism for prime movers comprising a fluid admitting valve means, a fluid actuated motor controlling said valve means, a pilot valve controlling said motor, a speed governor for the pilot valve, a dashpot connected to said motor and comprising a cylinder, a piston movable therein, said cylinder being filled with a liquid, and means for short-circuiting the upper and lower part of said dashpot whereby liquid can be displaced between the upper and lower part of said dashpot through said short-circuiting means, and means controlling said short-circuiting means in response to the rate of governor speed change.

4. A governing mechanism for prime movers comprising a fluid admitting valve means, a fluid actuated motor controlling said valve means, a pilot valve controlling said motor, a speed governor for the pilot valve, a dashpot connected to said motor and comprising a cylinder, a piston movable therein, said cylinder being filled with a liquid, and means for short-circuiting the upper and lower part of said dashpot whereby liquid can be displaced between the upper and lower part of said dashpot through said short-circuiting means, the latter comprising a valve, and means for actuating said valve in response to the rate of the governor speed change.

5. A governing mechanism for prime movers comprising a fluid admitting valve means, a fluid actuated motor controlling said valve means, a pilot valve controlling said motor, a speed governor for the pilot valve, a dashpot connected to said motor and comprising a cylinder, a piston movable therein, said cylinder being filled with a liquid, and means for short-circuiting the upper and lower part of said dashpot whereby liquid can be displaced between the upper and lower part of said dashpot through said short-circuiting means, the latter comprising a valve, and means for actuating said valve, said last mentioned means comprising a pumping cylinder having a piston and two non-return valves admitting fluid to said pumping cylinder, a conduit connecting said pumping cylinder with said first mentioned valve, and means for actuating the piston of said pumping cylinder in response to the governor speed change.

6. A governing mechanism for prime movers comprising a fluid admitting valve means, a fluid actuated motor controlling said valve means, a pilot valve controlling said motor, a speed governor for the pilot valve, a dashpot connected to said motor and comprising a cylinder, a piston movable therein, said cylinder being filled with a liquid, and means for short-circuiting the upper and lower part of said dashpot whereby liquid can be displaced between the upper and lower part of said dashpot through said short-circuiting means, the latter being arranged so as to normally cause a partial short-circuiting of said upper and lower parts of the dashpot, and means controlling said short-circuiting means in response to the rate of governor speed change.

In witness whereof, I have hereunto set my hand.

HANS KRAFT.